(12) United States Patent
Han et al.

(10) Patent No.: US 12,153,972 B1
(45) Date of Patent: Nov. 26, 2024

(54) ELECTRONIC DEVICE INCLUDING HARDWARE ARCHITECTURE FOR SUPPORTING INTER-PROCESS COMMUNICATION AND METHOD FOR PERFORMING INTER-PROCESS COMMUNICATION

(71) Applicant: METISX CO., LTD., Yongin-si (KR)

(72) Inventors: Sungju Han, Yongin-si (KR); Do Hun Kim, Yongin-si (KR); Ju Hyun Kim, Yongin-si (KR)

(73) Assignee: METISX CO., LTD., Yongin-si (KR)

( * ) Notice: Subject to any disclaimer, the term of this patent is extended or adjusted under 35 U.S.C. 154(b) by 0 days.

(21) Appl. No.: 18/410,470

(22) Filed: Jan. 11, 2024

(30) Foreign Application Priority Data

May 25, 2023 (KR) .......................... 10-2023-0067717

(51) Int. Cl.
   *G06F 9/44* (2018.01)
   *G06F 9/448* (2018.01)
   *G06F 9/54* (2006.01)

(52) U.S. Cl.
   CPC ............ *G06F 9/546* (2013.01); *G06F 9/4498* (2018.02)

(58) Field of Classification Search
   CPC ...................................................... G06F 9/546
   USPC ........................................................ 719/313
   See application file for complete search history.

(56) References Cited

U.S. PATENT DOCUMENTS

2022/0121451 A1*  4/2022  Zhou ...................... G06F 9/526

FOREIGN PATENT DOCUMENTS

| CN | 114185830 A | 3/2022 |
|---|---|---|
| JP | 2007-233976 A | 9/2007 |
| JP | 2013-525872 A | 6/2013 |
| KR | 10-2008-0067799 A | 7/2008 |
| KR | 10-2013-0093995 A | 8/2013 |
| KR | 10-1426341 B1 | 8/2014 |
| KR | 10-2014-0139923 A | 12/2014 |
| KR | 10-1557833 B1 | 10/2015 |
| KR | 10-1714659 B1 | 3/2017 |
| KR | 10-2452205 B1 | 10/2022 |

OTHER PUBLICATIONS

Korean Request for the Submission of an Opinion for KR 10-2023-0067717 dated Aug. 4, 2023.
Korean Decision to Grant a Patent for KR 10-2023-0067717 dated Nov. 10, 2023.

* cited by examiner

*Primary Examiner* — Timothy A Mudrick
(74) *Attorney, Agent, or Firm* — Sughrue Mion, PLLC

(57) ABSTRACT

As one aspect of the present disclosure, an electronic device is disclosed. The device includes: a plurality of clusters, wherein each of the plurality of clusters comprises a plurality of cores; mailboxes uniquely corresponding to each of the plurality of clusters; and a system bus, wherein the inter-process communication may be performed between a sending core and a receiving core of the plurality of cores, and if the sending core and the receiving core are included in the same cluster, a mailbox corresponding to the same cluster may be configured to perform the inter-process communication without going through the system bus, and if the sending core and the receiving core are included in different clusters, mailboxes corresponding to each of the different clusters may be configured to perform the inter-process communication via the system bus.

18 Claims, 7 Drawing Sheets

ELECTRONIC DEVICE INCLUDING HARDWARE ARCHITECTURE FOR SUPPORTING INTER-PROCESS COMMUNICATION AND METHOD FOR PERFORMING INTER-PROCESS COMMUNICATION

CROSS-REFERENCE TO RELATED APPLICATION

This application claims priority under 35 U.S.C § 119 to Korean Patent Application No. 10-2023-0067717 filed on May 25, 2023, in the Korean Intellectual Property Office, the entire contents of which is hereby incorporated by reference.

TECHNICAL FIELD

The present disclosure relates to an electronic device including a hardware architecture for supporting inter-process communication and a method of performing inter-process communication.

BACKGROUND

Inter-process communication (IPC) refers to the operation of sending and receiving data between processes. Operating systems implement IPC in a variety of ways.

In order to operate a variety of ways of IPC implemented by operating systems, appropriate support by a hardware architecture is needed. Generally, in an embedded multicore architecture, a hardware architecture is designed in such a way that cores directly send and receive data via a path such as a system bus in order to perform IPC. A hardware architecture in which cores are configured to communicate directly with other cores via a system bus is the most universal structure. Such a hardware architecture has universality and can thus support a variety of ways of IPC implemented by various operating systems.

However, the method in which cores directly send and receive data with each other via a system bus prevents these cores from performing other tasks while performing IPC tasks. Therefore, the performance of each of the cores deteriorates while performing IPC.

Further, there is also a problem that the load on the system bus increases if there is a large amount of data to send and receive between cores. Increased load on the system bus also affects traffic between other components that use the system bus, which can lead to reduced performance of the entire computing system.

In addition, many-core processors have recently been widely used in high-performance computing. Many-core processors are a special kind of multicore processor designed for high levels of parallel processing. In many-core architectures, IPC operations can occur more frequently because there are tens to thousands of independent processor cores. Therefore, the impact of IPC on the entire computing system can be greater, and the problem of performance degradation caused by implementing IPC using a system bus can be more serious.

For example, as a prior art document to the present disclosure, there is Korean Patent No. 10-1714659.

SUMMARY

It is a technical object of the present disclosure to provide an electronic device that results in the improvement of overall computing performance by implementing a hardware architecture that can increase the efficiency of IPC tasks.

It is another technical object of the present disclosure to provide an electronic device that can improve the performance of processor cores by performing IPC via a coprocessor referred to as a mailbox.

It is yet another technical object of the present disclosure to provide an electronic device that can reduce the load on a system bus by performing IPC utilizing a storage in a mailbox.

It is still another technical object of the present disclosure to provide an electronic device that can effectively improve IPC performance at a relatively low cost by implementing a storage in a mailbox using SRAM (static random-access memory).

The present disclosure may be implemented in a variety of ways, including devices, systems, methods, or computer programs stored on a readable storage medium.

As one aspect of the present disclosure, an electronic device including a hardware architecture for supporting inter-process communication is disclosed. The device includes: a plurality of clusters, wherein each of the plurality of clusters comprises a plurality of cores; mailboxes uniquely corresponding to each of the plurality of clusters; and a system bus, wherein the inter-process communication may be performed between a sending core and a receiving core of the plurality of cores, and if the sending core and the receiving core are included in the same cluster, a mailbox corresponding to the same cluster may be configured to perform the inter-process communication without going through the system bus, and if the sending core and the receiving core are included in different clusters, mailboxes corresponding to each of the different clusters may be configured to perform the inter-process communication via the system bus.

In one embodiment, the storage comprises a data area and a context area.

In one embodiment, the storage comprises SRAM (static random-access memory).

In one embodiment, the controller comprises a finite state machine (FSM).

In one embodiment, the sending core is configured to: generate an IPC command, and start the inter-process communication by sending the IPC command to the first mailbox corresponding to the first cluster including the sending core.

In one embodiment, the IPC command comprises data and a context index.

In one embodiment, the controller of the first mailbox is configured to read a context corresponding to the context index from the context area of the storage of the first mailbox when receiving the IPC command from the sending core.

In one embodiment, the controller of the first mailbox is configured to calculate a destination value for identifying a receiving-side mailbox corresponding to the cluster including the receiving core based at least in part on the read context.

In one embodiment, the context written to the context area comprises at least a pointer, a receiver, and an address, and the destination value is calculated based on the pointer, the receiver, and the address.

In one embodiment, if the receiving-side mailbox identified by the destination value is the same as the first mailbox, the controller of the first mailbox is configured to: write the data included in the IPC command to the data area of the storage of the first mailbox, update the pointer of the context stored in the context area of the storage of the first mailbox, and generate an interrupt in the receiving core.

In one embodiment, if the receiving-side mailbox identified by the destination value is a second mailbox that is different from the first mailbox, the controller of the first mailbox is configured to transmit the data included in the IPC command to the second mailbox via the system bus.

In one embodiment, the controller of the second mailbox is configured to: write the data included in the IPC command to the data area of the storage of the second mailbox, update the pointer of the context stored in the context area of the storage of the second mailbox, and generate an interrupt in the receiving core.

In one embodiment, data written to the data area and a context written to the context area are configured to implement a queue.

In one embodiment, the electronic device is configured to manipulate the queue via a primary read for the context area and a secondary read for the data area.

In one embodiment, wherein the context written to the context area comprises at least a pointer, and the electronic device is configured to perform manipulation on the queue by manipulating the pointer.

In one embodiment, the queue is configured such that a first context written to the context area of a sending-side mailbox corresponding to the sending core and a second context written to the context area of a receiving-side mailbox corresponding to the receiving core are paired.

In one embodiment, the first context and the second context each comprise at least a pointer for expressing a structure of the queue, and the electronic device is configured such that if the pointer of the first context is changed, the pointer of the second context is changed in the same way, and if the pointer of the second context is changed, the pointer of the first context is changed in the same way.

In one embodiment, in implementing the queue, data is stored only in the receiving-side mailbox.

According to another aspect of the present disclosure, a method of performing inter-process communication is disclosed. The method may include: generating an IPC command for inter-process communication between a sending core and a receiving core of a plurality of cores; transmitting the IPC command to a first mailbox corresponding to a cluster including the sending core; calculating, by the first mailbox, a destination value that identifies a receiving-side mailbox based at least in part on the IPC command; and performing the inter-process communication without going through a system bus if the receiving-side mailbox identified by the destination value is the same as the first mailbox, and performing the inter-process communication via the system bus if the receiving-side mailbox identified by the destination value is a second mailbox that is different from the first mailbox.

According to various embodiments of the present disclosure, a hardware architecture that can increase the efficiency of IPC tasks can be implemented.

According to various embodiments of the present disclosure, overall computing performance can be improved by enhancing the efficiency of IPC tasks.

According to various embodiments of the present disclosure, IPC can be performed via a coprocessor referred to as a mailbox.

According to various embodiments of the present disclosure, the load on a system bus can be reduced by performing IPC utilizing a storage in a mailbox.

According to various embodiments of the present disclosure, IPC performance can be effectively improved at a relatively low cost by implementing a storage in a mailbox with SRAM (static random-access memory).

The effects of the present disclosure are not limited to those mentioned above, and other effects that have not been mentioned will be clearly understood by those of ordinary skill in the art to which the present disclosure pertains (hereinafter referred to as a 'person of ordinary skill') from the description of the claims.

BRIEF DESCRIPTION OF THE DRAWINGS

As the following drawings accompanying the present specification illustrate preferred embodiments of the present disclosure and serve to help further understand the technical idea of the present disclosure together with the detailed description of the present disclosure, the present disclosure should not be construed as being limited to those described in such drawings.

DETAILED DESCRIPTION OF THE PREFERRED EMBODIMENTS

Figure 1:
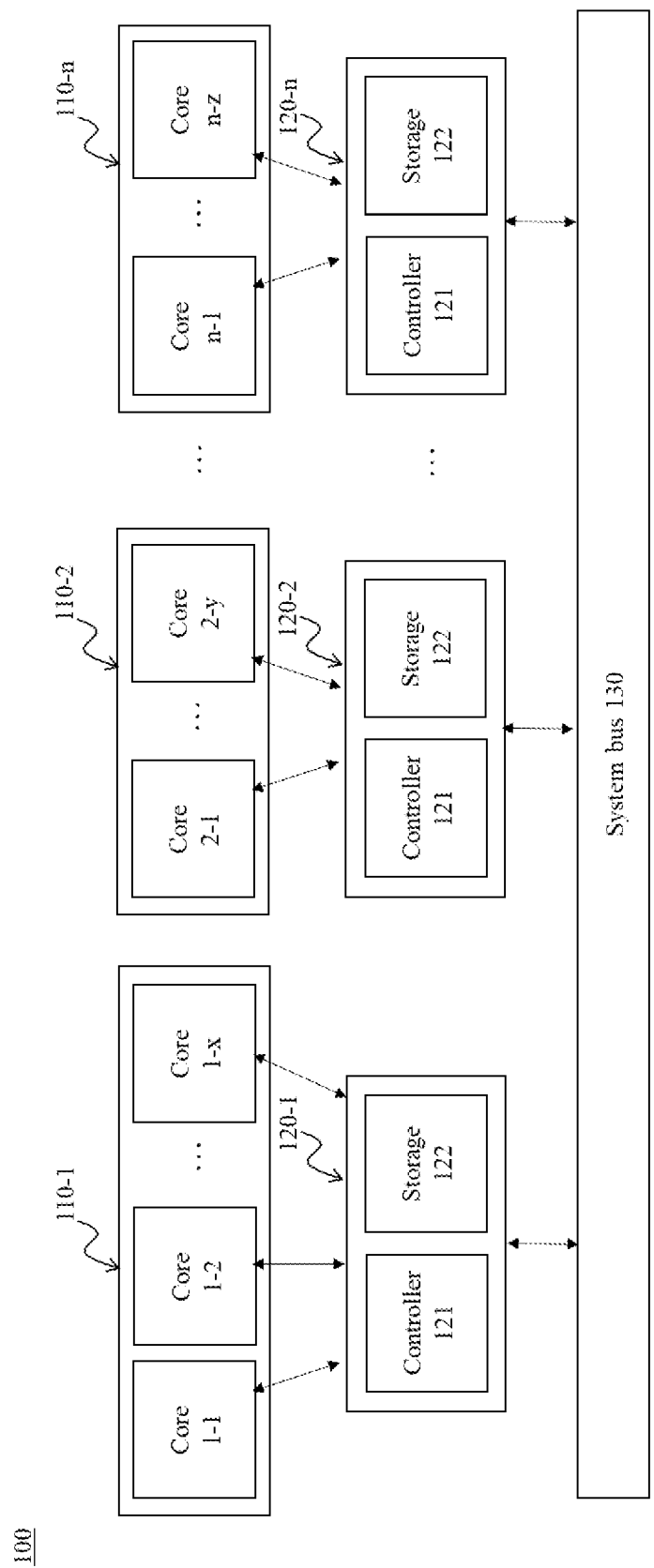
FIG. 1 is a block diagram conceptually illustrating a hardware architecture included in an electronic device in accordance with one embodiment of the present disclosure.

The various embodiments described herein are illustrated for the purpose of clearly describing the technical idea of the present disclosure, and are not intended to limit it to particular embodiments. The technical idea of the present disclosure includes various modifications, equivalents, and alternatives of each embodiment described herein, and embodiments obtained by selectively combining all or part of each embodiment. In addition, the scope of rights of the technical idea of the present disclosure is not limited to the various embodiments or specific descriptions thereof presented below.

Terms used herein, including technical or scientific terms, may have the meaning commonly understood by those of ordinary skill in the art to which the present disclosure pertains unless defined otherwise.

As used herein, expressions such as "include(s)," "may include," "is/are provided with", "may be provided with," "have/has," "can have," and the like mean that target features (e.g., functions, operations, components, or the like) exist, and do not preclude the presence of other additional features. That is, such expressions should be understood as open-ended terms that imply the possibility of including other embodiments.

Singular expressions herein include plural expressions unless the context clearly dictates that they are singular. Further, plural expressions include singular expressions unless the context clearly dictates that they are plural. Throughout the specification, when a part is said to include a component, this means that it may further include other components rather than excluding other components unless particularly described to the contrary.

Further, the term 'module' or 'part' used herein refers to a software or hardware component, and the 'module' or 'part' performs certain roles. However, the 'module' or 'part' is not meant to be limited to software or hardware. The 'module' or 'part' may be configured to reside on an addressable storage medium or may be configured to run one or more processors. Therefore, as one example, the 'module' or 'part' may include at least one of components such as software components, object-oriented software components, class components, and task components, processes, functions, properties, procedures, subroutines, segments of program code, drivers, firmware, microcode, circuitry, data, databases, data structures, tables, arrays, or variables. Functions provided within the components and the 'modules' or 'parts' may be combined into a smaller number of components and 'modules' or 'parts,' or may be further separated into additional components and 'modules' or 'parts.'

According to one embodiment of the present disclosure, a 'module' or 'part' may be implemented with a processor and a memory. The 'processor' should be interpreted broadly so as to encompass general-purpose processors, central processing units (CPUs), microprocessors, digital signal processors (DSPs), controllers, microcontrollers, state machines, and the like. In some circumstances, the 'processor' may also refer to an application-specific integrated circuit (ASIC), a programmable logic device (PLD), a field programmable gate array (FPGA), or the like. The 'processor' may also refer to, for example, a combination of processing devices, such as a combination of a DSP and a microprocessor, a combination of a plurality of microprocessors, a combination of one or more microprocessors combined with a DSP core, or a combination of any other such components. In addition, the 'memory' should be interpreted broadly so as to encompass any electronic component capable of storing electronic information. The 'memory' may also refer to various types of processor-readable media, such as random-access memory (RAM), read-only memory (ROM), non-volatile random-access memory (NVRAM), programmable read-only memory (PROM), erasable-programmable read-only memory (EPROM), electrically erasable PROM (EEPROM), flash memory, magnetic or optical data storage, registers, etc. A memory is said to be in electronic communication with a processor if the processor can read information from and/or write information to the memory. A memory integrated with a processor is in electronic communication with the processor.

As used herein, expressions such as "first" and "second" are used to distinguish one object from another when referring to a plurality of objects of the same kind unless the context indicates otherwise, and do not limit the order or importance among the relevant objects.

As used herein, expressions such as "A, B, and C," "A, B, or C," "A, B, and/or C," or "at least one of A, B, and C," "at least one of A, B, or C one," "at least one of A, B, and/or C," "at least one selected from A, B, and C," "at least one selected from A, B, or C," and "at least one selected from A, B, and/or C" may mean all possible combinations of each listed item or listed items. For example, "at least one selected from A and B" may refer to all of (1) A, (2) at least one of A's, (3) B, (4) at least one of B's, (5) at least one of A's and at least one of B's, (6) at least one of A's and B, (7) at least one of B's and A, (8) A and B.

As used herein, the expression "based on" is used to describe one or more factors that affect the action or operation of a decision or determination described in the phrase or sentence including the expression, and this expression does not preclude additional factors that affect the action or operation of that decision or determination.

As used herein, the expression that a component (e.g., a first component) is "connected" or "coupled" to another component (e.g., a second component) may mean that said component is connected or coupled to said another component directly, as well as connected or coupled via yet another component (e.g., a third component).

As used herein, the expression "configured to" may have the meaning of "set to," "having the ability to," "modified to," "made to," "capable of," etc., depending on the context. The expression is not limited to the meaning of "designed specifically in hardware," and for example, a processor configured to perform a particular operation may refer to a generic-purpose processor capable of performing that particular operation by executing software.

Hereinafter, various embodiments of the present disclosure will be described with reference to the accompanying drawings. In the accompanying drawings and the description of the drawings, identical or substantially equivalent components may be assigned the same reference numerals. Further, in the description of various embodiments below, repeated descriptions of the same or corresponding components may be omitted, which, however, does not mean that the corresponding components are not included in those embodiments.

FIG. 1 is a block diagram conceptually illustrating a hardware architecture included in an electronic device in accordance with one embodiment of the present disclosure. Referring to FIG. 1, the hardware architecture of the electronic device in accordance with one embodiment of the present disclosure may be a multicore architecture or many-core architecture that includes a plurality of cores. Many-core processors may be considered a special kind of multi-core processor designed for high levels of parallel processing. Therefore, the present disclosure does not specifically distinguish between a many-core architecture and a multicore architecture and does not use them in a limiting sense. However, example embodiments of the present disclosure will be described based on a structure commonly known as a many-core architecture for convenience of description.

In addition, the term core used in the present disclosure is used in the same meaning as a processor as a logic circuit for processing instructions of a computing system. Each core may be one CPU (central processing unit). Alternatively, one CPU may include multiple cores, and each core within one CPU may be recognized as an independent processor by an operating system. Therefore, in the present disclosure, embodiments will be described not with particular distinction or limitation among a hardware architecture including a plurality of CPUs, a hardware architecture including a plurality of processors, and a hardware architecture including a plurality of cores. However, example embodiments of the present disclosure will be described based on a hardware architecture commonly including a plurality of cores for convenience of description.

A process may refer to a unit in which a program is allocated a memory space by an operating system and executed. In other words, a process is a term on the software side. On the other hand, a processor or core is a term on the hardware side. The operating system causes the hardware architecture to make a data transfer between processors in order to perform inter-process communication (IPC) requested by a software layer. The operating system can appropriately implement a method of processing IPC according to the hardware architecture. According to the present disclosure, a new hardware architecture utilizing a coprocessor called a mailbox is implemented, and, thus, supports to allow the operating system to perform an IPC processing method that is improved over conventional techniques. However, since the interfacing method between the hardware architecture in accordance with the present disclosure and the operating system can be appropriately implemented according to the kernel design method of the operating system, a description on how to design the kernel of the operating system will be omitted in the present disclosure.

Referring to FIG. 1, a hardware architecture 100 included in an electronic device in accordance with one embodiment of the present disclosure may include a plurality of clusters 110-1, 110-2 to 110-$n$, mailboxes 120-1, 120-2 to 120-$n$, and a system bus 130. The term electronic device used in the present disclosure may be a computing device (e.g., a personal computer, a smartphone, a tablet, a laptop, etc.) that includes such a hardware architecture 100. Alternatively, the term electronic device used in the present disclosure may be components included in these computing devices (e.g., a system-on-chip (SoC), an embedded system, etc.).

Referring to FIG. 1, the plurality of clusters 110-1, 110-2 to 110-$n$ each include a plurality of cores. For example, a first cluster 110-1 may include x cores, core 1-1 to core 1-$x$, a second cluster 110-2 may include y cores, core 2-1 to core 2-$y$, and an n-th cluster 110-$n$ may include z cores, core n-1 to core n-z. In general, many-core processors are designed to perform complex parallel processing and may include tens to thousands of simple and independent processor cores. In addition, as massively parallel computing for artificial intelligence (AI) and machine learning (ML) applications has emerged, hardware architectures with up to nearly a million cores have also appeared. Therefore, n, x, y, and z in the example shown in FIG. 1 are merely example values and are not limited to particular ranges of integer values.

Referring to FIG. 1, the hardware architecture 100 in accordance with one embodiment of the present disclosure may include the mailboxes 120-1, 120-2 to 120-$n$ that uniquely correspond to each of the plurality of clusters 110-1, 110-2 to 110-$n$. For example, the first cluster 110-1 may correspond to a first mailbox 120-1, the second cluster 110-2 may correspond to a second mailbox 120-2, and the n-th cluster 110-$n$ may correspond to an n-th mailbox 120-$n$. By uniquely corresponding, it means that each cluster corresponds to a single mailbox. In other words, one mailbox and one cluster are configured to correspond to each other.

The mailboxes 120-1, 120-2 to 120-$n$ are of a structure in which they are shared by each cluster 110-1, 110-2 to 110-$n$ consisting of multiple cores, and communication between cores in the same cluster can be processed by reading/writing data from/to a storage 122 inside the mailboxes 120-1, 120-2 to 120-$n$ without going through the system bus 130.

Referring to FIG. 1, the hardware architecture 100 in accordance with one embodiment of the present disclosure may include the system bus 130. The system bus 130 is a path that allows the mailboxes to send and receive data to and from other components (e.g., other mailboxes) in the electronic device. For example, the system bus 130 may be a data bus. The data bus is a set of signal lines for the processor to send and receive data to and from memory, I/O devices, or the like, and the number of data lines determines the number of bits that can be transmitted between these components at one time. For example, if the width of the data bus is 32 bits, data transmission can be made by 32 bits at a time. However, the width of the system bus being 32 bits is merely an example value and does not limit the scope of the present disclosure.

Although the example illustrated in FIG. 1 does not show a path for direct communication (arrow) between the cores and the system bus 130, it is simply omitted. As a matter of course, the cores, core 1-1 to core n-z, can communicate with other components using the system bus 130. However, as the cores do not use the system bus 130 directly in implementing IPC according to embodiments of the present disclosure (in embodiments of the present disclosure, the system bus 130 is used by the mailboxes rather than by the cores even when the system bus 130 is used), this communication path is not shown in FIG. 1 in order to help understand the present disclosure.

According to embodiments of the present disclosure, IPC is performed between a sending core and a receiving core of the plurality of cores. The sending core and the receiving core may be included in the same cluster or may be included in different clusters. For example, referring to FIG. 1, the IPC between the cores included in the first cluster (e.g., the IPC between core 1-1 to core 1-$x$), the IPC between the cores included in the second cluster (e.g., the IPC between core 2-1 to core 2-$y$), and the IPC between the cores included in the n-th cluster (e.g., the IPC between core n-1 to core n-z) are cases where the sending core and the receiving core are included in the same cluster. On the other hand, referring to FIG. 1, the IPC between the cores included in the first cluster and the cores included in the second to n-th clusters (e.g., the IPC from core 1-1 to core 2-$y$, etc.) is a case where the sending core and the receiving core are included in different clusters.

According to one embodiment of the present disclosure, if the sending core and the receiving core are included in the same cluster, the mailbox corresponding to the same cluster is configured to perform IPC without going through the system bus. This will be described in more detail later with reference to FIG. 4.

According to one embodiment of the present disclosure, if the sending core and the receiving core are included in different clusters, mailboxes corresponding to each of the different clusters are configured to perform IPC via the system bus. This will be described in more detail later with reference to FIG. 5.

Figure 2:
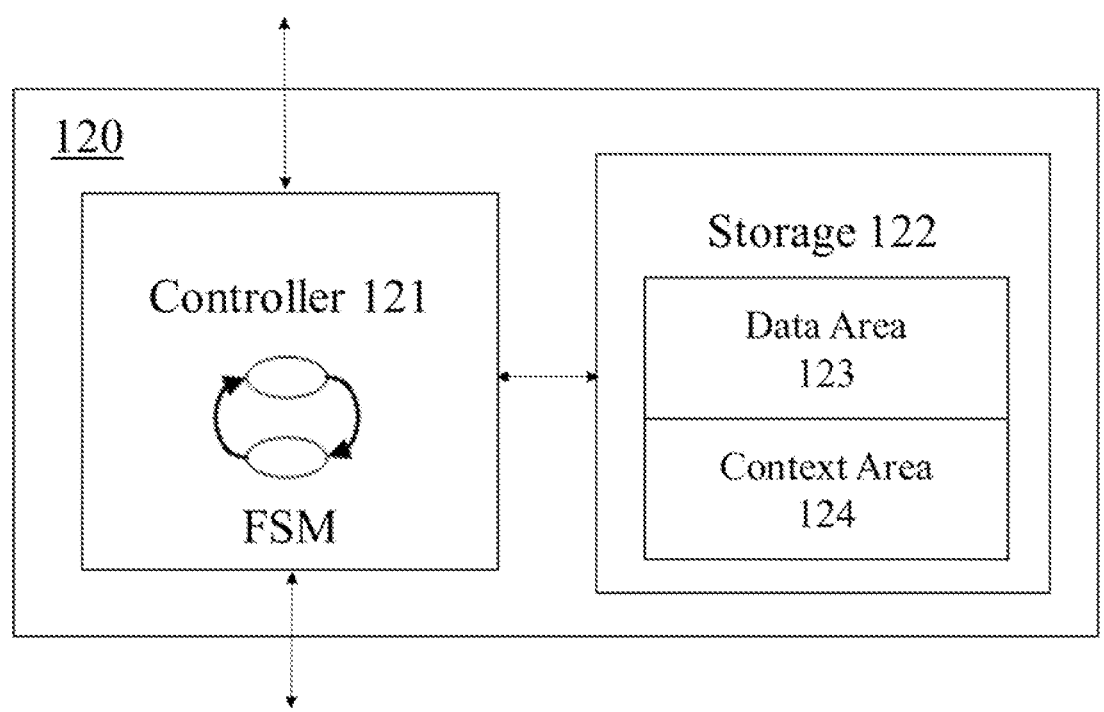
FIG. 2 is a block diagram conceptually illustrating a mailbox of an electronic device in accordance with one embodiment of the present disclosure.

FIG. 2 is a block diagram conceptually illustrating a mailbox of an electronic device in accordance with one embodiment of the present disclosure. Referring to FIG. 2, a mailbox of the electronic device in accordance with one embodiment of the present disclosure may include a controller 121 and a storage 122. The controller 121 and the storage 122 may operate in combination as a coprocessor, which can be understood as a kind of auxiliary logic circuit for processing IPC between cores.

Referring to FIG. 2, the controller 121 may include a finite state machine (FSM). The FSM is a mathematical model used to design computer programs and electronic logic circuits. FSMs may be automata, or abstract machines, that can have a finite number of states. These machines can have exactly one state at any given time, make a transition, changing from one state to another, when an event occurs by an input value, and generate output values during this transition process. The mailbox 120 of the hardware architecture 100 in accordance with one embodiment of the present disclosure can increase efficiency by implementing the controller 121 as an FSM since the types of events or kinds of states are not complex as will be described later with reference to FIGS. 4 and 5. For example, the controller 121 can process IPC tasks while operating as an FSM, and may be configured to check the pointer whenever data is written to or read from the storage 122 and immediately transfer an interrupt to the core that should receive the data.

Referring to FIG. 2, the storage 122 may include a data area 123 and a context area 124. The data area 123 may store what is to be processed by the processor core, i.e., data. The context area 124 may store contexts that include information such as pointers or addresses. The pointers in the context may be queue pointers, and these queue pointers may set the connection structures of queues. Specific examples of data and contexts stored in the storage 122 will be described below with reference to FIGS. 3a and 3b.

Figure 3A:
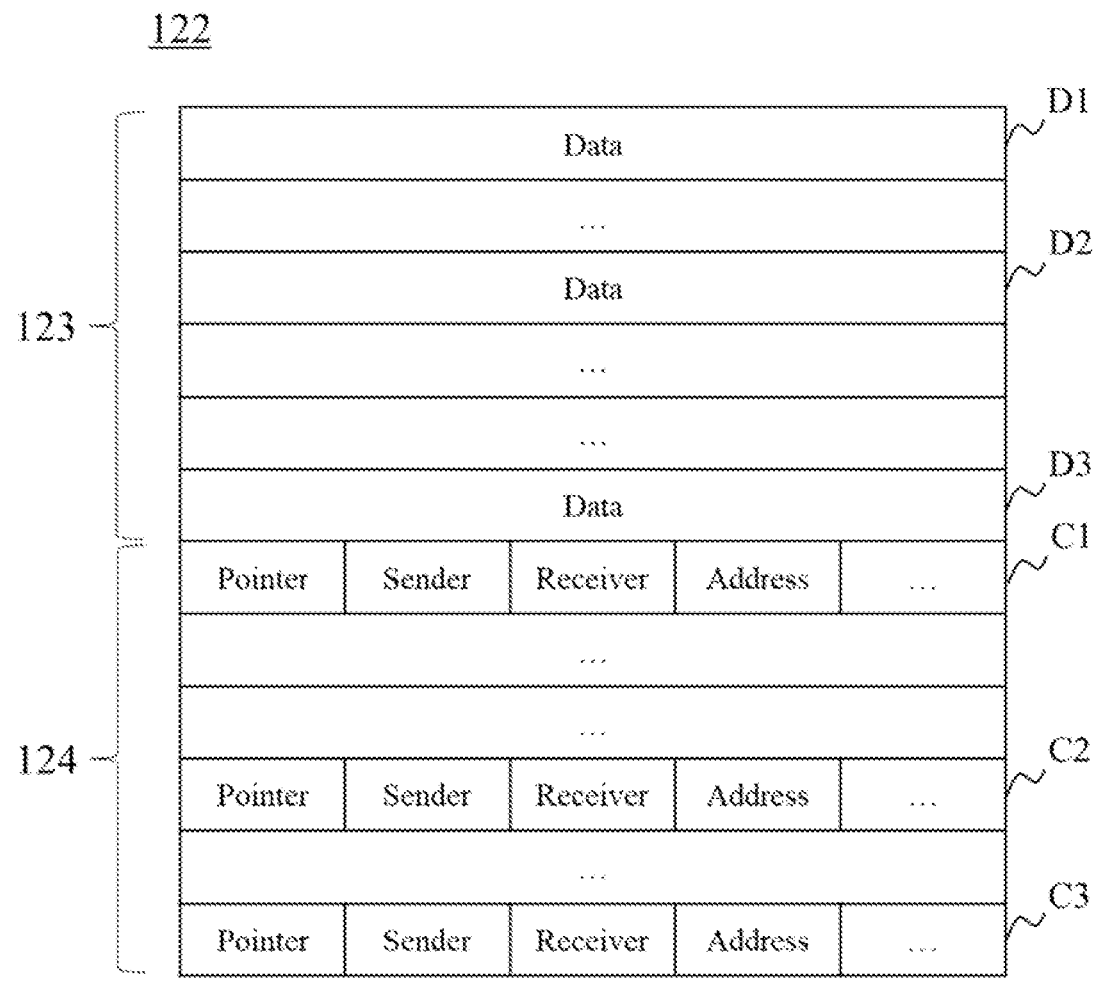
FIGS. 3a and 3b are example diagrams conceptually illustrating a storage included in a mailbox of an electronic device in accordance with one embodiment of the present disclosure.
Figure 3B:
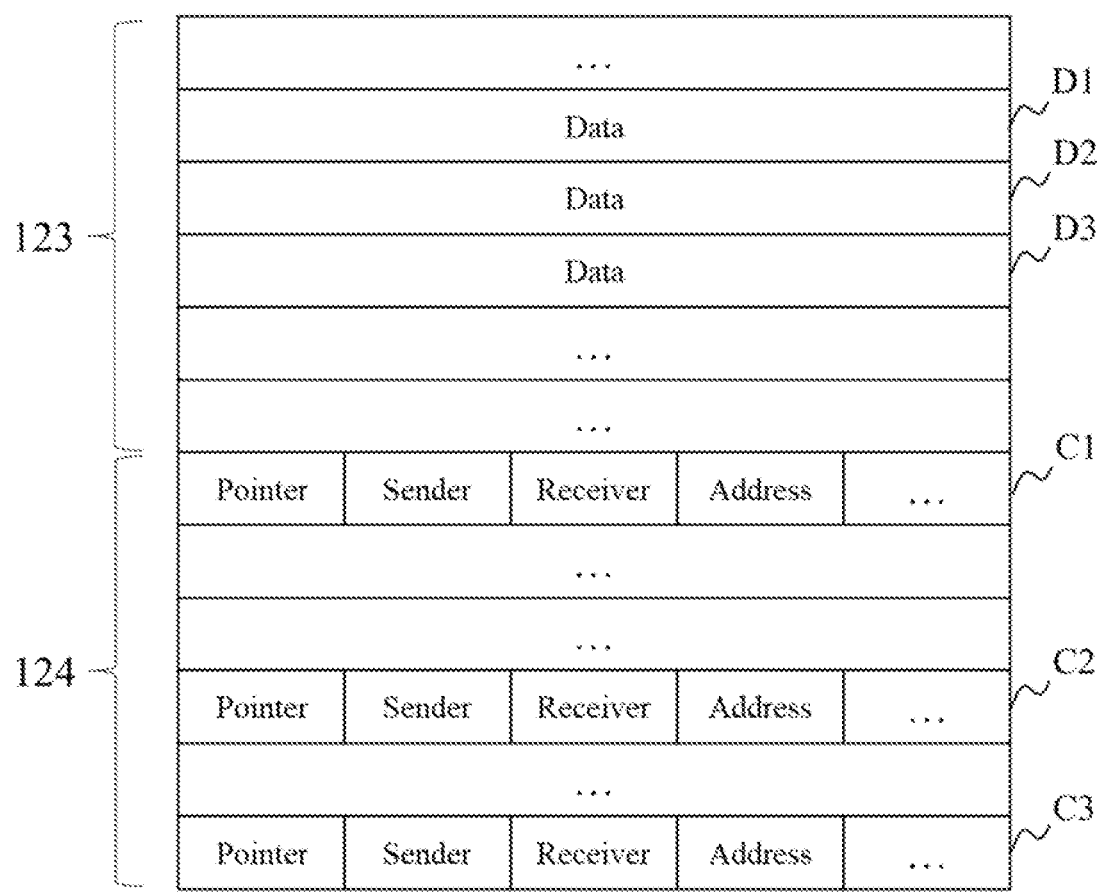

FIGS. 3a and 3b are example diagrams conceptually illustrating a storage included in a mailbox of an electronic device in accordance with one embodiment of the present disclosure. Referring to FIGS. 3a and 3b, the data area 123 may store at least one piece of data D1, D2, and D3, and the context area 124 may store at least one context C1, C2, and C3. Although not explicitly shown in FIGS. 3a and 3b, additional data and/or contexts may be further included in addition to the data and contexts shown in the drawings.

In the hardware architecture 100 in accordance with embodiments of the present disclosure, the storage 122 in the mailbox 120 may be used for the purpose of implementing a queue for IPC. The queue is of a first-in, first-out (FIFO) data structure in which the output sequence is determined by the input sequence of data. According to embodiments of the present disclosure, since a large amount of IPC may be performed in parallel between multiple cores, a data structure in the form of a queue may be used in order to process IPC in sequence without missing it out. Under this technical background, the data area 123 may be configured to store the data of the queue, and the context area 124 may be configured to store the connection structure of the queue and other information related to IPC.

The contexts C1, C2, and C3 may include at least some of a pointer, a sender, a receiver, and an address.

According to one embodiment of the present disclosure to be described with reference to FIG. 3a, the pointer may include a head pointer and a tail pointer. Specifically, the head pointer may be information pointing to the front of the queue, and the tail pointer may be information pointing to the rear of the queue. Output operations, for example, dequeue operations, may be performed via the head pointer of the queue. Input operations, for example, enqueue operations, may be performed via the tail pointer of the queue. The sender may be a value that identifies information related to the core that has sent data, i.e., the sending core. The receiver may be a value that identifies information related to the core that will receive the data, i.e., the receiving core. The address may be a value that identifies the location where data corresponding to the context is stored. The pointer, sender, receiver, and address may each be information containing only one data unit, but may each be information containing a plurality of data units. For example, just as the pointer includes the head pointer and the queue pointer, the sender, receiver, and address may also include a plurality of data units. The connection structure of the queue may be checked via the pointer, the information on the sending core and the receiving core among the information on the IPC may be checked via the sender and receiver, and the location where the data is stored (i.e., the address of the data) may be checked via the address.

For example, assume a case where the context C1 shown in FIG. 3a represents one queue, and that this queue includes data D1, D2, and D3, respectively. If D1, D2, and D3 form a queue connected in the order D1→D2→D3, the head pointer of the pointer of C1 may represent the address where D1 is stored, and the tail pointer of the pointer of C1 may represent the address where D3 is stored. Further, in order to express the size of the queue, the context may further include information on the queue size.

According to another embodiment of the present disclosure to be described with reference to FIG. 3b, the pointer may be a queue pointer. Specifically, the queue pointer may store as a pointer an address value that points to a preceding node or succeeding node for a particular queue node. In general, the queue pointer stores an address value pointing to a succeeding queue node as a point. The sender may be a value that identifies information related to the core that has sent data, i.e., the sending core. The receiver may be a value that identifies information related to the core that will receive the data, i.e., the receiving core. The address may be a value that identifies the location where data corresponding to the context is stored. The pointer, sender, receiver, and address may each be information containing only one data unit, but may each be information containing a plurality of data units. The connection structure of the queue may be checked via the pointer, the information on the sending core and the receiving core among the information on the IPC may be checked via the sender and receiver, and the location where the data is stored (i.e., the address of the data) may be checked via the address.

For example, assume a case where the contexts C1, C2, and C3 shown in FIG. 3 refer to data D1, D2, and D3, respectively. In this example situation, the address field stored in C1 may be the address value in which D1 is stored, the address field stored in C2 may be the address value in which D2 is stored, and the address field stored in C3 may be the address value in which D3 is stored. If D1, D2, and D3 form a queue connected in the order D2→D1→D3, the pointer field stored in C2 may be the address value in which C1 corresponding to the context of the succeeding queue node is stored, the pointer field stored in C1 may be the address value in which C3 corresponding to the context of the succeeding queue node is stored, and the pointer field stored in C3 may store a NULL value in the sense that there is no succeeding queue node.

Meanwhile, according to one embodiment of the present disclosure, the storage 122 may include static random-access memory (SRAM). SRAM is faster than DRAM, and thus is mainly utilized in areas where speed is important, such as memory devices inside the CPU (e.g., pipelines, processor registers, CPU caches, etc.). In addition, low-speed, low-capacity SRAM is mainly utilized in areas where low power consumption and low cost are important. In other words, SRAM is an effective and appropriate low-cost, high-efficiency structure in implementing the storage 122 in the mailbox 120 for processing IPC. However, since implementing the storage 122 with SRAM is merely one example embodiment of the present disclosure, the scope of the present disclosure is not limited thereto. For example, the storage 122 can be implemented even with a structure such as a flip-flop rather than SRAM.

In the following, an operation of performing IPC between a sending core and a receiving core according to embodiments of the present disclosure will be described with reference to FIGS. 4 and 5.

Figure 4:
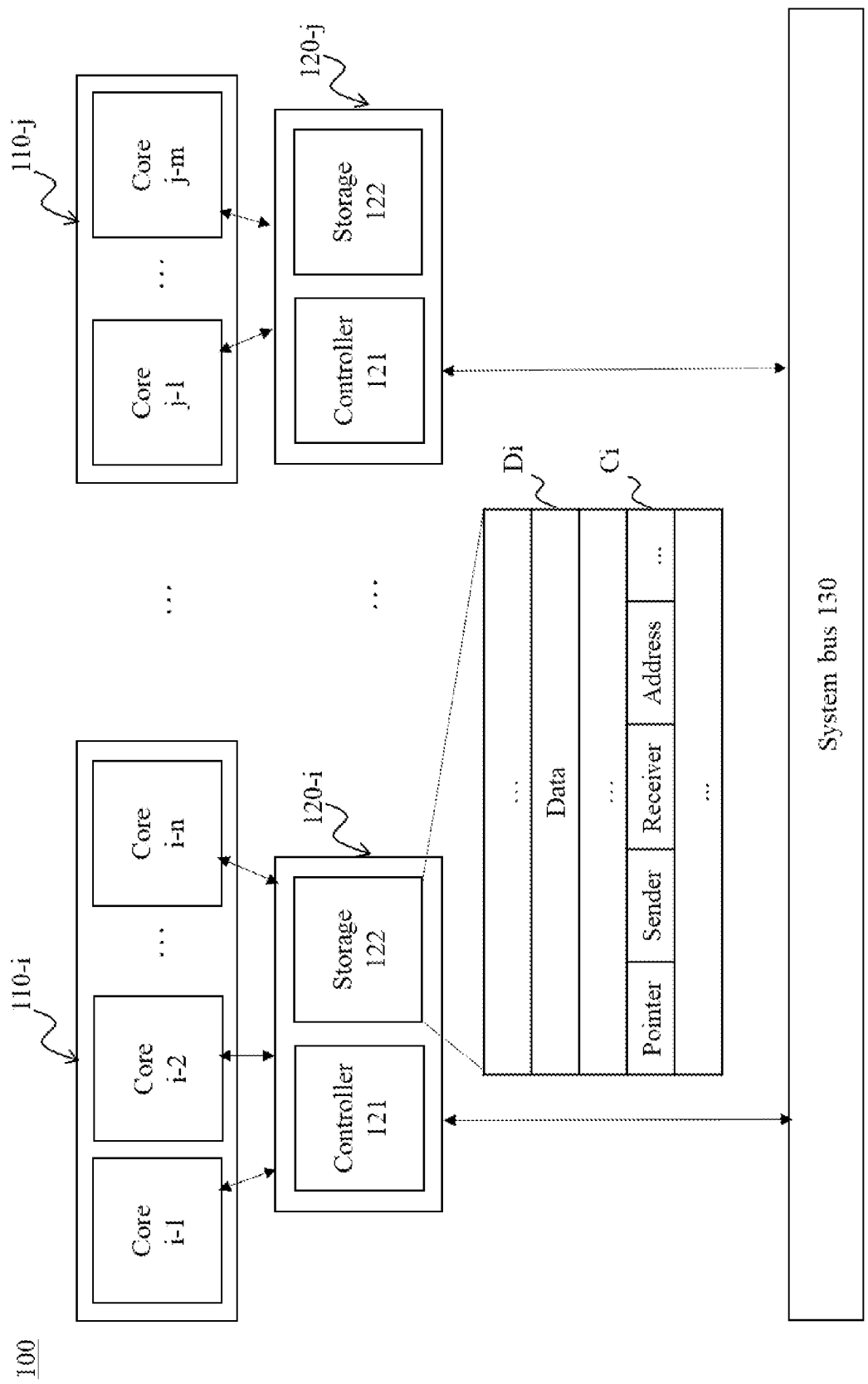
FIG. 4 is a diagram for describing an operation in which inter-process communication is performed between cores in the same cluster according to one embodiment of the present disclosure.

FIG. 4 is a diagram for describing an operation in which inter-process communication is performed between cores in the same cluster according to one embodiment of the present disclosure. FIG. 5 is a diagram for describing an operation in which inter-process communication is performed between cores in different clusters according to one embodiment of the present disclosure.

Referring to FIG. 4, an operation of performing IPC from a sending core (e.g., core i-1) to a receiving core (e.g., core i-2) can be assumed. In this case, the sending core (e.g., core i-1) and the receiving core (e.g., core i-2) belong to the same cluster 110-$i$.

Referring to FIG. 4, an IPC operation begins as the sending core (core i-1) generates an IPC command. Here, the IPC command may include data and a context index. The data represents the data to be transferred to the receiving core (core i-2), and the context index identifies the location where the context to read in relation to the corresponding IPC operation is stored.

The generated IPC command is transmitted from the sending core (core i-1) to a mailbox 120-$i$ corresponding to the cluster 110-$i$ to which the sending core belongs. The controller 121 in the mailbox 120-$i$ receives the transmitted IPC command and reads the context from the storage 122 in the mailbox 120-$i$. Specifically, the controller 121 in the mailbox 120-$i$ may be configured to read a context Ci corresponding to a context index included in the IPC command from the context area 124 of the storage 122.

Next, the controller 121 of the mailbox 120-$i$ may be configured to calculate a destination value based at least in part on the read context Ci. The destination value may be a value for identifying the receiving-side mailbox 120-$i$ corresponding to the cluster 110-$i$ that includes the receiving core (core i-2).

According to one embodiment of the present disclosure, the context may include at least a pointer, a receiver, and an address. The destination value may be calculated based on the pointer, receiver, and address stored in the context Ci read from the context area. For example, the destination value may be computed by passing the receiver, address, and pointer as parameters to a function f for calculating the destination value. In other words, the destination value may be computed by means of the function Destination=f (receiver, address, pointer).

The example shown in FIG. 4 is a case where the receiving-side mailbox 120-$i$ identified by the destination value is the same as the sending-side mailbox 120-$i$, as described previously. In this case, the controller 121 of the sending-side mailbox (which is also the receiving-side mailbox) writes the data Di included in the IPC command to the data area 123 of the storage 122 of that mailbox 120-$i$.

Next, the controller 121 of the sending-side mailbox 120-$i$ may set a connection structure of the queue by updating the pointer of the context stored in the context area 124 of the storage 122. For example, the connection structure of the queue may be set by modifying information on the pointer that includes a head pointer and/or a tail pointer of the queue.

Next, the controller 121 of the sending-side mailbox 120-$i$ is configured to allow the receiving core (core i-2) to fetch data Di from the queue by generating an interrupt in the receiving core (core i-2).

According to the IPC operation described previously with reference to FIG. 4, the IPC task may be performed from the sending core (core i-1) to the receiving core (core i-2) without using the system bus 130 at all. As such, according to an embodiment of the present disclosure, since the IPC task can be performed by the corresponding mailbox 120-$i$ if the sending-side mailbox 120-$i$ and the receiving-side mailbox 120-$i$ are the same, there is the advantage of being able to reduce the load on the system bus.

Figure 5:
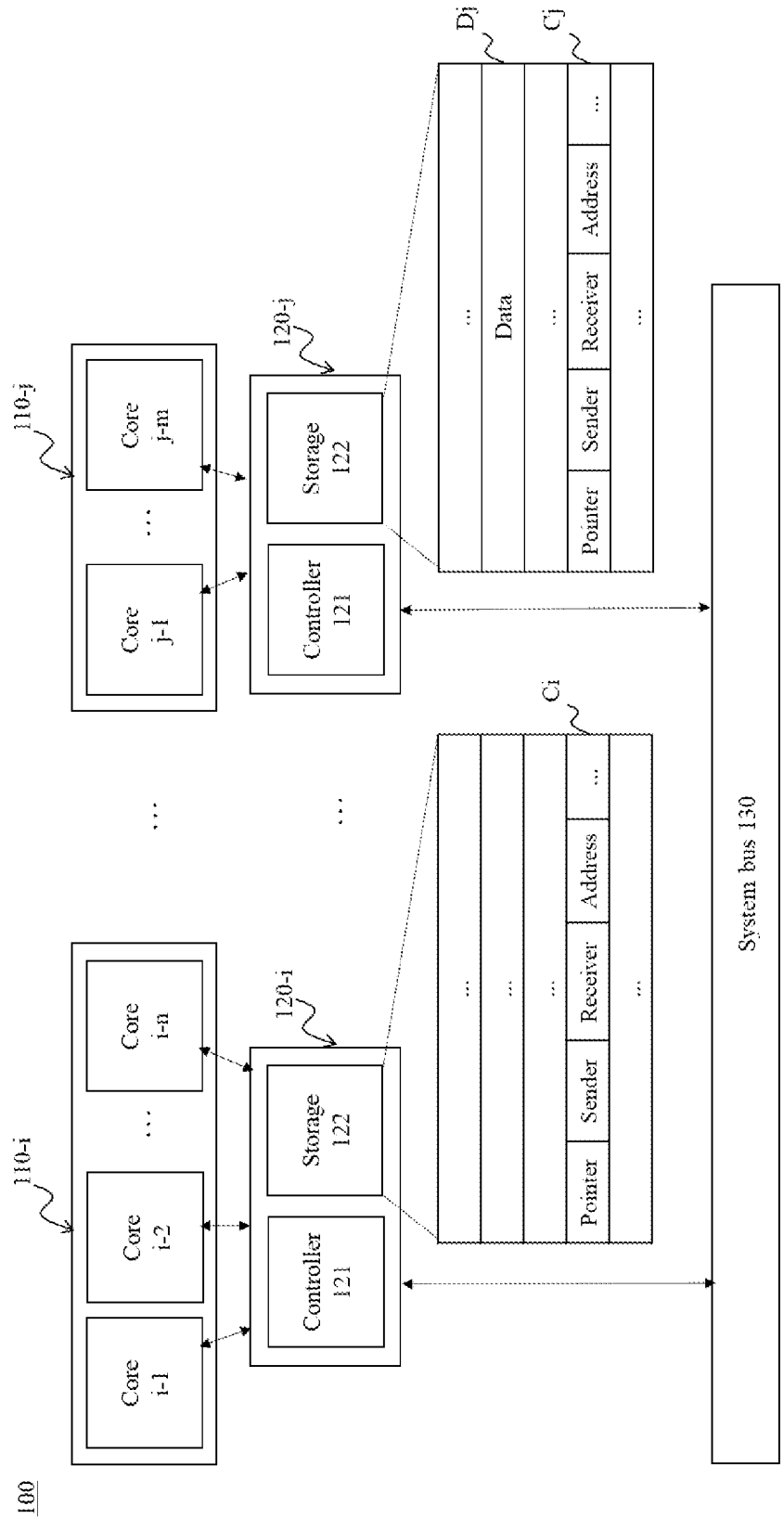
FIG. 5 is a diagram for describing an operation in which inter-process communication is performed between cores in different clusters according to one embodiment of the present disclosure.

Referring to FIG. 5, an operation of performing IPC from a sending core (e.g., core i-1) to a receiving core (e.g., core j-1) can be assumed. In this case, the sending core (core i-1) belongs to the i-th cluster 110-$i$, whereas the receiving core (core j-1) belongs to the j-th cluster 110-$j$, and thus, it can be said that they belong to different clusters.

Referring to FIG. 5, an IPC operation begins as the sending core (core i-1) generates an IPC command. Here, the IPC command may include data and a context index. The data represents the data to be transferred to the receiving core (core j-1), and the context index identifies the location where the context to read in relation to the corresponding IPC operation is stored.

The generated IPC command is transmitted from the sending core (core i-1) to the mailbox 120-$i$ corresponding to the cluster 110-$i$ to which the sending core belongs. The controller 121 in the mailbox 120-$i$ receives the transmitted IPC command and reads the context from the storage 122 in the mailbox 120-$i$. Specifically, the controller 121 in the mailbox 120-$i$ may be configured to read a context Ci corresponding to a context index included in the IPC command from the context area 124 of the storage 122.

Next, the controller 121 of the mailbox 120-$i$ may be configured to calculate a destination value based at least in part on the read context Ci. The destination value may be a value for identifying the receiving-side mailbox 120-$j$ corresponding to the cluster 110-$j$ that includes the receiving core (core j-1).

Similar to what was described previously with reference to FIG. 4, according to one embodiment of the present disclosure, the context may include at least a pointer, a receiver, and an address. The destination value may be calculated based on the pointer, receiver, and address stored in the context Ci read from the context area. For example, the destination value may be computed by passing the receiver, address, and pointer as parameters to a function f for calculating the destination value. In other words, the destination value may be computed by means of the function Destination=f (receiver, address, pointer).

The example shown in FIG. 5 is a case where the receiving-side mailbox 120-$j$ identified by the destination value is different from the sending-side mailbox 120-$i$, as described previously. In this case, the controller 121 of the sending-side mailbox 120-$i$ may be configured to transmit the data Dj included in the IPC command to the receiving-side mailbox 120-$j$ via the system bus 130.

Next, the controller 121 of the receiving-side mailbox 120-$j$ writes the data Dj included in the IPC command to the data area 123 of the storage 122 in the receiving-side mailbox 120-$j$.

Next, the controller 121 of the receiving-side mailbox 120-$j$ may set the connection structure of the queue by updating the pointer of the context stored in the context area 124 of the storage 122. For example, according to one embodiment of the present disclosure described with reference to FIG. 3$a$, the connection structure of the queue may be set by modifying information on the pointer that includes a head pointer and/or a tail pointer. Specifically, the tail pointer may be modified when new data is inputted, and the head pointer may be modified when the data previously stored in the queue is outputted. Alternatively, according to another embodiment of the present disclosure described with reference to FIG. 3b, the pointer of the context in the location where the pointer pointing to the last node (rear) of the queue indicates may be modified. For example, the pointer of the corresponding context may be modified to point to the context Cj corresponding to the data Dj. And it may be prepared for a subsequent input by assigning the address of the context Cj to the pointer that points to the last node of the queue and processing it as a newly added last node.

Next, the controller 121 of the receiving-side mailbox 120-j is configured to allow the receiving core (core j-1) to fetch the data Dj from the queue by generating an interrupt in the receiving core (core j-1).

According to embodiments of the present disclosure, a queue can be implemented as discussed previously by treating the context area 124 and the data area 123 of the storage 122 in the mailbox 120 as one pair. For example, as described with reference to FIG. 3a, the data D1, D2, and D3 written to the data area 123 and one context written to the context area 124 may be mapped, thereby implementing a queue. Alternatively, as described with reference to FIG. 3b, the data D1, D2, and D3 written to the data area 123 and the contexts C1, C2, and C3 written to the context area 124 may be paired, thereby implementing a queue. If the storage 122 in the mailbox 120 is implemented with SRAM when implementing the queue in these ways, the queue can be manipulated via a total of two read operations. For example, a pointer value representing information on the connection structure of the queue and an address value representing the location where the data is stored may be obtained by performing a primary read on the context area, and the queue may be manipulated indirectly by performing a secondary read on the data area based thereon.

Meanwhile, manipulation of the connection structure of the queue may be performed by manipulating pointers included in the contexts C1, C2, and C3. It may also be manipulated to modify the connection structure of the queue by modifying the head pointer and tail pointer of a particular context as described with reference to FIG. 3a, or a newly added queue node may be processed by modifying the pointer of the context representing the last node of the queue as described with reference to FIG. 3b.

According to one embodiment of the present disclosure, the queue may be configured such that a first context written to the context area of the sending-side mailbox corresponding to the sending core and a second context written to the context area of the receiving-side mailbox corresponding to the receiving core are paired. More specifically, according to one embodiment of the present disclosure, the first context and the second context may each include at least pointers for representing the structure of the queue (e.g., a head pointer and/or a tail pointer), and may be configured such that if the pointer of the first context is changed, the pointer of the second context is changed in the same way, and if the pointer of the second context is changed, the pointer of the first context is changed in the same way. This can be understood as the first context and the second context being paired and keeping the pointers the same in order to ensure that different cores can send/receive data to/from one queue without any problems.

For example, the manipulation of a pointer to a queue may proceed as follows regardless of whether the sending-side mailbox 120-i and the receiving-side mailbox 120-i are the same as described with reference to FIG. 4, or whether the sending-side mailbox 120-i and the receiving-side mailbox 120-j are different as described with reference to FIG. 5.

A series of operations will be discussed first from the perspective of a sending-side mailbox. When the sending-side mailbox 120-i receives an IPC command from the sending core, the sending-side mailbox 120-i subsequently performs context reading and destination (e.g., data address and context address of the receiving-side mailbox) computation in the storage 122. The sending-side mailbox 120-i then modifies and writes the context to the storage 122. In this case, it can indicate that new data has been added to the queue by modifying the context by increasing the tail pointer. And the sending-side mailbox 120-i transmits the data to the receiving-side mailbox 120-i or 120-j. The receiving-side mailbox 120-i or 120-j writes the received data to its storage 122. At this time, in implementing the queue, the data may be stored only in the data area of the receiving-side mailbox and not in the receiving-side mailbox. The sending-side mailbox 120-i transmits the context to the receiving-side mailbox 120-i or 120-j, and the context being transmitted at this time is a context with the tail pointer increased as described above. Therefore, when the receiving-side mailbox 120-i or 120-j writes this context to its storage 122, it can store the context with the tail pointer increased, and accordingly, the first context and the second context can maintain the same pointer with each other. The receiving-side mailbox 120-i or 120-j may cause the receiving core to perform IPC by generating an interrupt in the receiving core.

Next, a series of operations will be discussed from the perspective of a receiving-side mailbox. The receiving-side mailbox 120-i or 120-j receives a command from the receiving core. Thereafter, the receiving-side mailbox 120-i or 120-j reads the context associated with the command from its storage 122 and computes the destination (e.g., the data address of the receiving-side mailbox and the context address of the sending-side mailbox). The receiving-side mailbox 120-i or 120-j modifies and writes the context to memory, and at this time, it can indicate that data is to be deleted from the queue by modifying the context by increasing the head pointer. The receiving-side mailbox 120-i or 120-j reads data from the storage 122 and transfers it to the core. Thereafter, the receiving-side mailbox 120-i or 120-j transmits the context to the sending-side mailbox 120-i, and the context being transmitted at this time is the context with the head pointer increased as described above. Therefore, when the sending-side mailbox 120-i writes this context to its storage 122, it can store the context with the head pointer increased, and accordingly, the first context and the second context can maintain the same pointer with each other.

Figure 6:
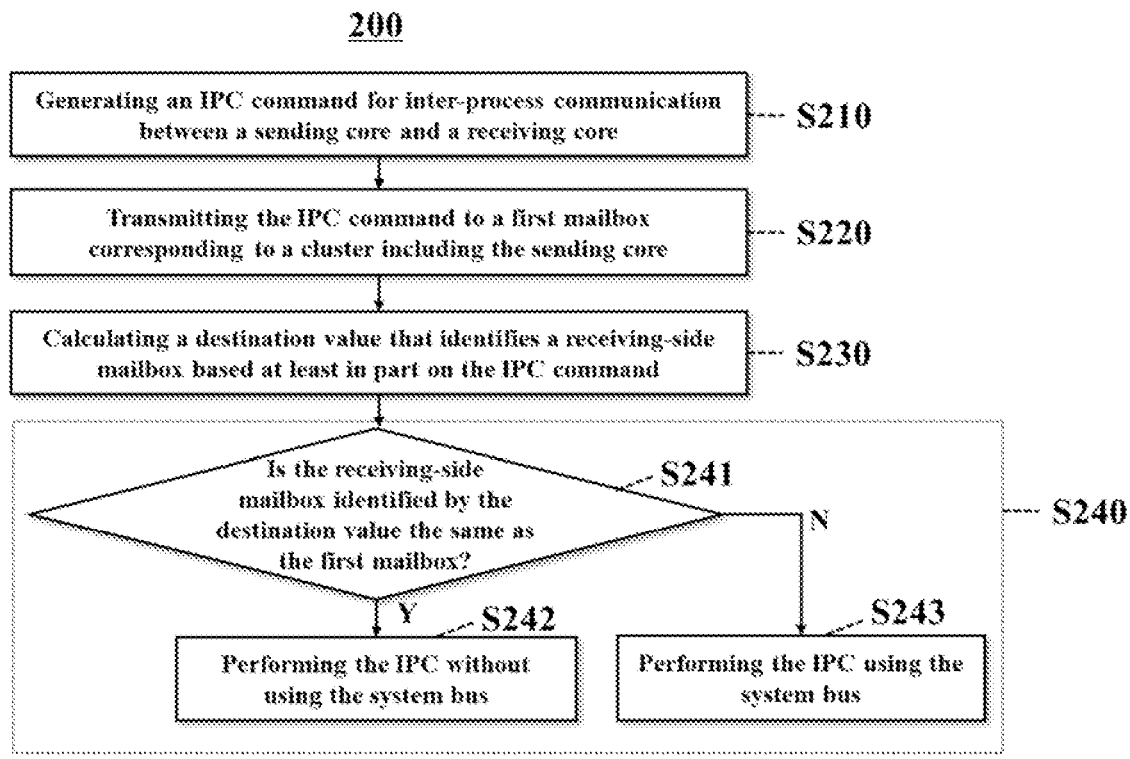
FIG. 6 is a flowchart regarding a method of performing inter-process communication according to one embodiment of the present disclosure.

FIG. 6 is a flowchart regarding a method of performing inter-process communication according to one embodiment of the present disclosure. Referring to FIG. 6, a method 200 of performing IPC in an electronic device that includes a hardware architecture 100 in accordance with example embodiments of the present disclosure described based on FIGS. 1 to 5 is illustrated.

An example method 200 in accordance with one embodiment of the present disclosure may include generating an IPC command for inter-process communication between a sending core and a receiving core of a plurality of cores (S210), transmitting the IPC command to a first mailbox (sending-side mailbox) corresponding to a cluster including the sending core (S220), calculating a destination value that identifies a receiving-side mailbox based at least in part on the IPC command by the first mailbox (sending-side mailbox) (S230), and performing IPC via a predetermined determination process based on the destination value (S240).

Steps S210 to S230 may be steps commonly performed in the embodiments described with reference to FIGS. 4 and 5, i.e., in an operation in which IPC is performed between cores in the same cluster and an operation in which IPC is performed between cores in different clusters.

In step S240, the execution path may be branched off depending on whether the receiving-side mailbox identified by the destination value is the same as the first mailbox (sending-side mailbox). For example, it is determined whether the receiving-side mailbox identified by the destination value is the same as the first mailbox (sending-side mailbox) (S241), and if they are the same, IPC may be performed without using the system bus 130 (S242), and if they are not the same, IPC may be performed using the system bus 130 (S243). For example, the operation of step S242 may be a subsequent operation of the IPC operation between cores in the same cluster according to one embodiment of the present disclosure described with reference to FIG. 4. For example, the operation of step S243 may be a subsequent operation of the IPC operation between cores in different clusters according to one embodiment of the present disclosure described with reference to FIG. 5. Since these operations have been described with reference to FIGS. 4 and 5, a detailed description thereof will be omitted here.

On the other hand, as a matter of course, what can be implemented (e.g., queue manipulation, etc.) via the electronic device in accordance with the embodiments described above with reference to FIGS. 1 to 5 can be added to and executed in the embodiment of FIG. 6 even if they are operations or steps that are not specifically shown in the method 200 in accordance with the example embodiment of FIG. 6. Since these operations have been described with reference to FIGS. 1 to 5, a detailed description thereof will be omitted here.

The methods in accordance with the present disclosure may be computer-implemented methods. In the present disclosure, each step of the methods has been shown and described in a predetermined order, but the respective steps may be performed in an order that can be arbitrarily combined in accordance with the present disclosure in addition to being performed in sequence. In one embodiment, at least some steps may be performed in parallel, iteratively, or heuristically. The present disclosure does not exclude making changes or modifications to those methods. In one embodiment, at least some steps may be omitted or other steps may be added.

The various embodiments of the present disclosure may be implemented as software recorded on a machine-readable recording medium. The software may be software for implementing the various embodiments of the present disclosure described above. The software may be inferred from the various embodiments of the present disclosure by programmers skilled in the art to which the present disclosure pertains. For example, the software may be machine-readable commands (e.g., code or code segments) or programs. The machine is a device that can operate according to instructions called from a recording medium, and may be, for example, a computer. In one embodiment, the machine may be an electronic device that includes the hardware architecture 100 in accordance with embodiments of the present disclosure. In one embodiment, a processor of the machine may execute a called command and cause components of the machine to perform a function corresponding to the command. A recording medium may refer to any type of recording medium in which data is stored that can be read by machines. The recording medium may include, for example, ROM, RAM, CD-ROM, a magnetic tape, a floppy disk, an optical data storage device, and the like. In one embodiment, the recording medium may be implemented in a form distributed over computer systems connected with a network, or the like. The software may be stored and executed in a distributed manner on computer systems, or the like. The recording medium may be a non-transitory recording medium. A non-transitory recording medium refers to a tangible medium regardless of whether data is stored semi-permanently or temporarily, and does not include signals that are propagated transitorily.

Although the technical idea of the present disclosure has been described above by means of various embodiments, the technical idea of the present disclosure includes various substitutions, modifications, and changes that can be made within the scope that can be understood by those having ordinary skill in the art to which the present disclosure pertains. Further, it should be understood that such substitutions, modifications and changes may fall within the scope of the appended claims. The embodiments in accordance with the present disclosure can be combined with each other. The respective embodiments can be combined in a variety of ways according to the number of cases, and embodiments created by combining them also fall within the scope of the present disclosure.

What is claimed is:

1. An electronic device including a hardware architecture for supporting inter-process communication, comprising:
    a plurality of clusters, wherein each of the plurality of clusters comprises a plurality of cores;
    a plurality of mailboxes, wherein each of the plurality of mailboxes corresponds uniquely to each of the plurality of clusters, each of the plurality of mailboxes comprises a controller and a storage, and the controller is configured to transfer an interrupt to a core that is to receive data each time the data is written to or read from the storage; and
    a system bus,
    wherein the inter-process communication is performed between a sending core and a receiving core of the plurality of cores,
    wherein, based on the sending core and the receiving core being included in a same cluster, a mailbox of the plurality of mailboxes corresponding to the same cluster is configured to perform the inter-process communication without going through the system bus,
    wherein, based on the sending core being and included in a first cluster and the receiving core being included in a second cluster that is different from the first cluster, a first mailbox of the plurality of mailboxes corresponding to the first cluster and a second mailbox of the plurality of mailboxes corresponding to the second cluster are configured to perform the inter-process communication via the system bus,
    wherein each storage of the plurality of mailboxes comprises a data area configured to store data to be processed by the plurality of cores of a corresponding cluster of the plurality of clusters, and a context area configured to store context information comprising at least a pointer.

2. The electronic device of claim 1, wherein the storage comprises a static random-access memory (SRAM).

3. The electronic device of claim 1, wherein the controller comprises a finite state machine (FSM).

4. The electronic device of claim 1, wherein the sending core is configured to:
  generate an IPC command, and
  start the inter-process communication by sending the IPC command to the first mailbox corresponding to the first cluster including the sending core.

5. The electronic device of claim 4, wherein the IPC command comprises data and a context index.

6. The electronic device of claim 5, wherein the controller of the first mailbox is configured to read a context corresponding to the context index from the context area of the storage of the first mailbox based on receiving the IPC command from the sending core.

7. The electronic device of claim 6, wherein the controller of the first mailbox is configured to calculate a destination value for identifying a receiving-side mailbox corresponding to the cluster including the receiving core based at least in part on the read context.

8. The electronic device of claim 7, wherein the context written to the context area further comprises a receiver, and an address, and the destination value is calculated based on the pointer, the receiver, and the address.

9. The electronic device of claim 7, wherein, based on the receiving-side mailbox identified by the destination value being the first mailbox, the controller of the first mailbox is configured to:
  write the data included in the IPC command to the data area of the storage of the first mailbox,
  update the pointer of the context area of the storage of the first mailbox, and
  generate an interrupt in the receiving core.

10. The electronic device of claim 7, wherein, based on the receiving-side mailbox identified by the destination value being the second mailbox, the controller of the first mailbox is configured to:
  transmit the data included in the IPC command to the second mailbox via the system bus.

11. The electronic device of claim 10, wherein the controller of the second mailbox is configured to:
  write the data included in the IPC command to the data area of the storage of the second mailbox,
  update the pointer of the context stored in the context area of the storage of the second mailbox, and
  generate an interrupt in the receiving core.

12. The electronic device of claim 2, wherein data written to the data area and a context written to the context area are configured to implement the queue.

13. The electronic device of claim 12, wherein the electronic device is configured to manipulate the queue via a primary read for the context area and a secondary read for the data area.

14. The electronic device of claim 13, wherein
  the electronic device is configured to perform manipulation on the queue by manipulating the pointer.

15. The electronic device of claim 12, wherein the queue is configured such that a first context written to the context area of a sending-side mailbox corresponding to the sending core and a second context written to the context area of a receiving-side mailbox corresponding to the receiving core are paired.

16. The electronic device of claim 15, wherein the first context and the second context each comprise at least a pointer for expressing the connection structure of the queue, and
  the electronic device is configured to:
    based on a first pointer of the first context being changed, change a second pointer of the second context in a same way, and
    based on the second pointer of the second context being changed, change the pointer of the first context in a same way.

17. The electronic device of claim 15, wherein in implementing the queue, data is stored only in the receiving-side mailbox.

18. A method of performing inter-process communication by an electronic device, the method comprising:
  generating an IPC command for inter-process communication between a sending core and a receiving core of a plurality of cores;
  transmitting the IPC command to a first mailbox that corresponds uniquely to a first cluster including the sending core;
  calculating, by the first mailbox, a destination value that identifies a receiving-side mailbox based at least in part on the IPC command; and
  performing the inter-process communication without going through a system bus, based on the receiving-side mailbox identified by the destination value being the first mailbox, and performing the inter-process communication via the system bus based on the receiving-side mailbox identified by the destination value being a second mailbox that is different from the first mailbox,
  wherein the second mailbox uniquely corresponds to a second cluster including the receiving core,
  wherein each of the first mailbox and the second mailbox comprises a controller and a storage,
  wherein each storage of the first mailbox and the second mailbox comprises a data area storing data to be processed by the plurality of cores and a context area storing context information comprising at least a pointer, and
  wherein the method further comprises:
    transferring an interrupt to a core of the plurality of cores that is to receive data each time the data is written to or read from the storage; and
    manipulating the queue by manipulating the pointer.

* * * * *